March 5, 1968 R. R. HAGER 3,371,486
BRAKE PEDAL MOUNTING MEANS
Filed Sept. 26, 1966 2 Sheets-Sheet 1
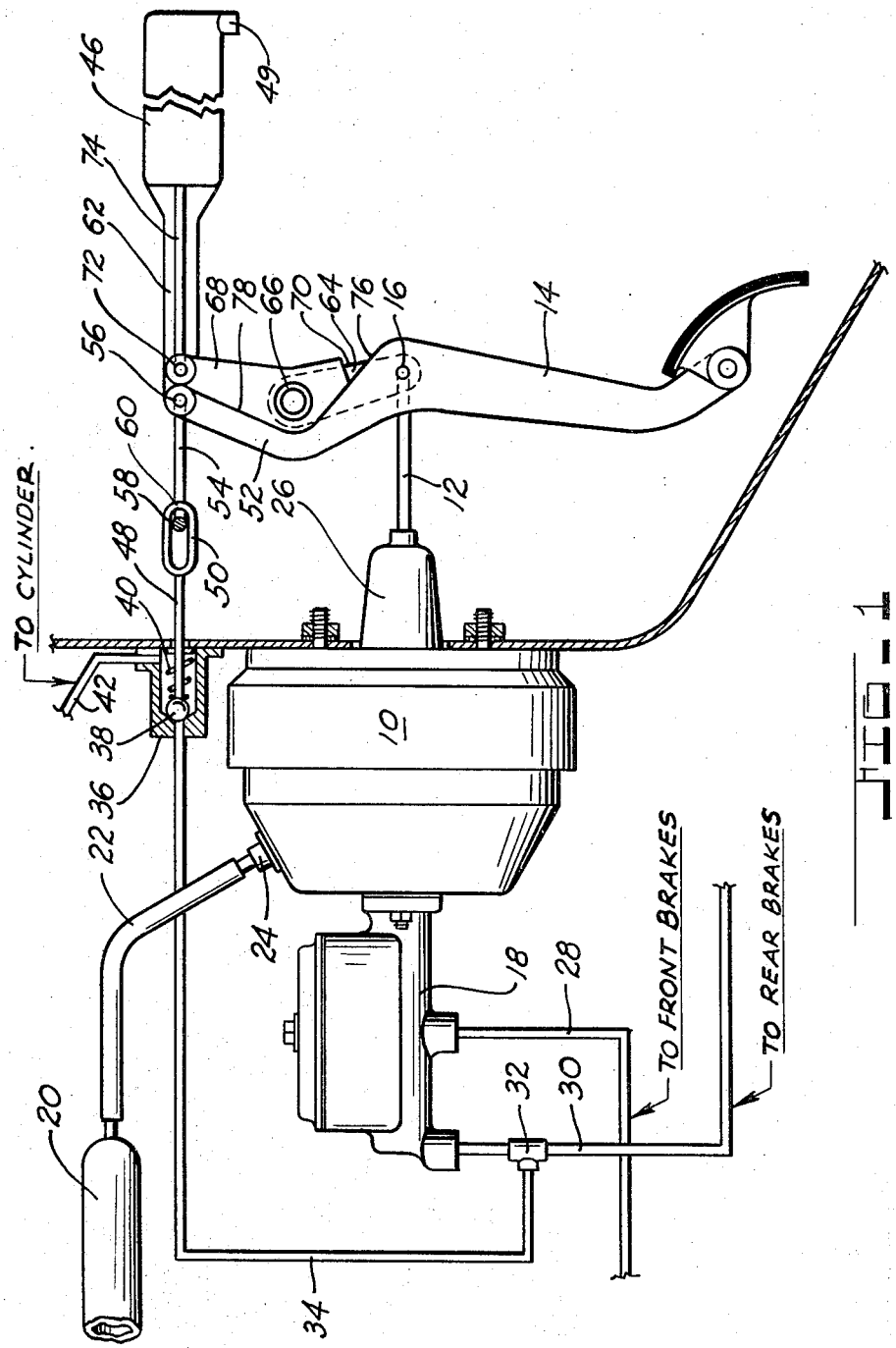
INVENTOR.
ROBERT R. HAGER.
BY
*Richard H. Geib*
ATTORNEY.

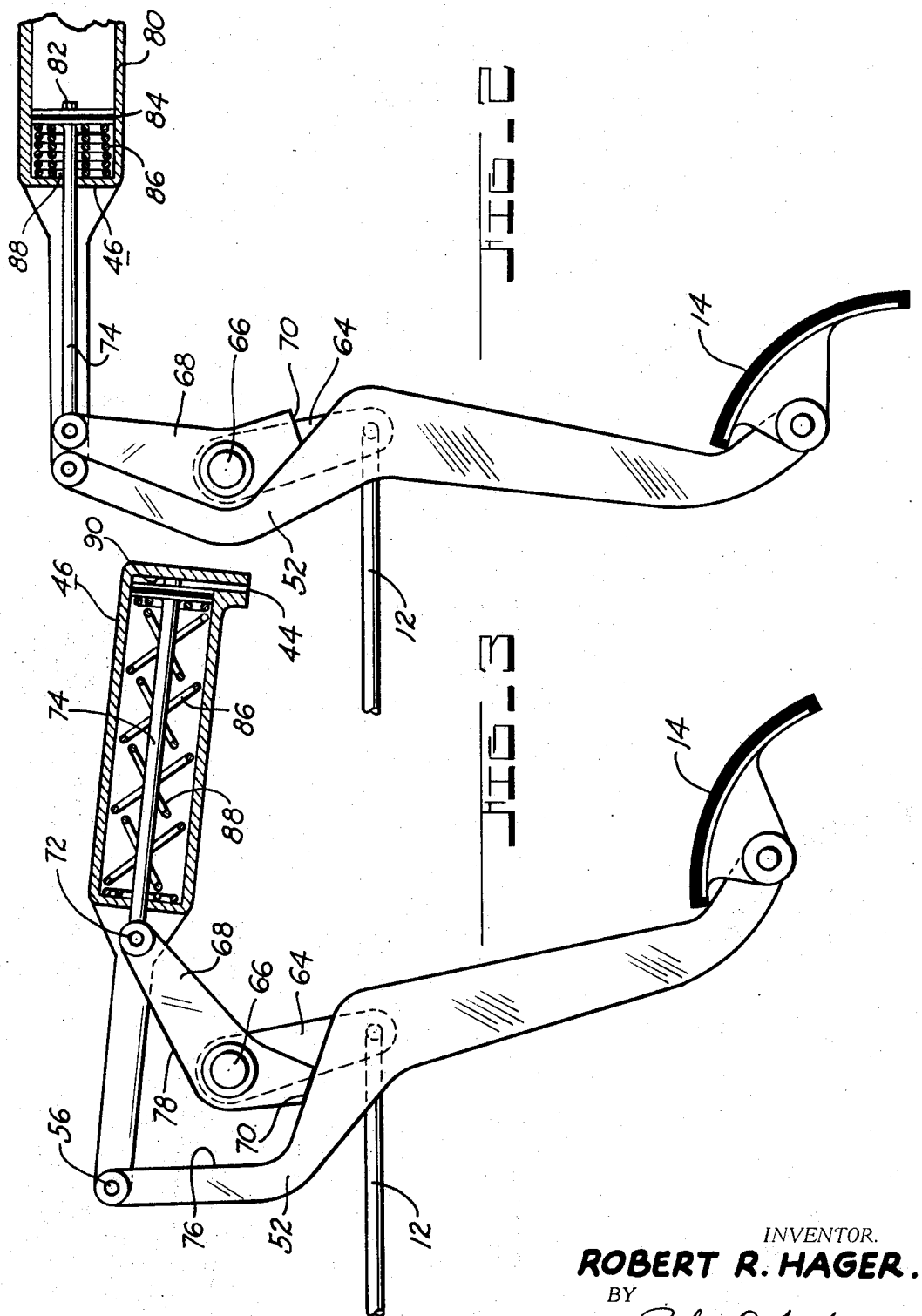

United States Patent Office 3,371,486
Patented Mar. 5, 1968

3,371,486
BRAKE PEDAL MOUNTING MEANS
Robert R. Hager, South Bend, Ind., assignor to The Bendix Corporation, a corporation of Delaware
Filed Sept. 26, 1966, Ser. No. 581,996
9 Claims. (Cl. 60—54.5)

This invention relates to a means to mount an operator-operated control member controlling a fluid pressure servomotor that will automatically provide for limited and maximum travel of the member.

While the invention is of particular interest to vehicle manufacturers utilizing power brake servomotors, it should be understood that there is considerable interest in utilization of this invention with regard to fluid pressure servomotors in general. The problem observed in conceiving this invention was that of providing a fluid pressure servomotor with an operator-operated control member that is capable of operating the servomotor with limited travel and also capable of manual operation of the device connected to the servomotor with a substantially greater travel of the member.

This has particular significance with fluid pressure servomotors providing power braking for vehicles in that short pedal travel is very important to manufacturers of motor vehicles, since less leg room in the driver's compartment becomes necessary and the brakes may be applied with ease simply by pivoting the foot about the heel between the accelerator and the brake pedal or treadle, which means that the brake pedal height and the accelerator pedal height are substantially equal. It has been further realized that there are times, when due to lack of sufficient booster pressure or power, or other causes, full manual operation becomes necessary, as for example, when starting the engine of a car while the latter is standing on a hill or slope without bothering to use the emergency brake, assuming the latter is serviceable, or in the case of a power failure. At such times, the driver or operator of the vehicle should be able to set the brakes by the same pedal, treadle or other manual member without necessitating any attention on the driver or operator's part other than to exert the additional force required for full manual braking and such is an important object of the instant invention.

It is a further object of this invention to provide an automatic means for varying the travel limitations of an operator-operated control member.

A still further object of this invention is to provide such an automatic means as aforementioned which is operative only after one has nearly reached the end of limited travel available for the creation of work by the fluid pressure servomotor without a resultant predetermined level of work being accomplished so that one would have to grope for the member as he would be shifting from one other member to the operator-operated control member for the fluid pressure servomotor.

An even still further object of this invention is to provide in the automatic means for changing from a limited travel to a maximum travel for an operator-operated control member a feature which will permit the development of work of the fluid pressure servomotor while changing the available travel for the member.

Other objects and advantages of this invention will appear from the drawings in which:

FIGURE 1 is a schematic detail of a fluid pressure servomotor in a power brake system having a means for varying the travel of a brake pedal in accordance with the principles of this invention;

FIGURE 2 is a side view of the brake pedal mounting means with a cross sectional view of an actuator for controlling the travel of the brake pedal in accordance with the principles of this invention; and FIGURE 3 is a similar side view of a brake pedal mounting means with the actuator in cross section shown in an attitude whereby the brake pedal is at its maximum travel position in contrast to the minimum travel position shown by FIGURE 2.

With more particular regard to FIGURE 1, there is shown a fluid pressure servomotor 10 that is controlled by a push rod 12 operatively connected to a brake pedal 14 as at a pivotal connection 16 for the developement of pressure within a split type master cylinder 18. The servomotor is of the type which receives a vacuum from an engine intake manifold 20 via a conduit 22 connected to a vacuum check valve 24 on one side of the servomotor 10 which is contrasted with atmospheric pressure entering via a rubber boot 26 on the other side of the servomotor because of an internal control valve operated by the push rod 12. As will be readily familiar to those skilled in the art the internal details of the servomotor 10 are such as to permit manual follow-through for the pressurization of the fluid within the split type master cylinder 18 in the event of a power failure such as loss of vacuum in the engine intake manifold 20 or rupture of the conduit 22. As will also be readily understood by those skilled in the art the split type master cylinder refers to a master cylinder which is capable of developing separate pressures that are delivered to the front and rear brakes of the motor vehicle by means of the separate conduits 28 and 30 respectively.

Within the conduit 30 there is provided a T-fitting 32 to which is connected another conduit 34 leading to a hydraulic check valve 36. The check valve is of a simple construction employing a ball valve 38 cooperating with the hydraulic pressure inlet and being biased by a spring 40 to normally block the inlet, as seen. A conduit 42 leads from the chamber immediately behind the ball check 38 in the check valve 36 to an inlet port 44 for a hydraulic motor 46. The ball check 38 is assembled to a valve control rod 48 provided with a slotted end 50. The brake pedal 14 is provided with an upper arm 52 having a link 54 connected by a pin 56 to its upper end. The link 54 is provided with a hooked end 58 that is inserted through the slotted end 50 of the valve control rod 48 such that in the low or limited travel position of the brake pedal 14, as seen in FIGURE 1, there will be a space between the hooked end 58 and the rear surface 60 of the slotted end 50 for the valve control rod 48. It should also be noted at this juncture that the housing for the motor 46 is provided with a mounting extension 62 which is also joined by the pin 56 to the upper arm 52 for the brake pedal 14.

The pivotal connection 16 of the brake pedal 14 also mounts a lever 64 that is affixed to a tubular shaft 66 which is in turn fixed to the structure of the automobile. This shaft 66 also rotatably mounts a lever or bellcrank, as it may be termed, 68 that is provided on its lower extremity with a cam or abutment surface 70 and is mounted by a pin 72 to a push rod 74 of the motor 46 at its upper extremity. The trailing surface 76 of the upper arm 52 for the brake pedal 14 is contoured to match a forward facing surface 78 of the bellcrank 68 so that in the limited travel position shown by FIGURE 1 the trailing surface 76, or cam surface as it may be termed, is abutting the forward facing surface 78 of the bellcrank 68 whereby the brake pedal 14 will rock about the shaft 66 in a limited arc.

With reference now to FIGURE 2, the motor 46 is seen to comprise a housing 80 within which a piston 82 having a seal 84 is reciprocatorily arranged and connected to the push rod 74. Between the housing 80 and the piston 82 a pair of stacked springs 86 and 88 are provided so as to normally bias the piston 82 to the rear of the housing 80. These springs are chosen so that they may be overcome by approximately 300 p.s.i. of hydraulic pressure in a preferred embodiment to assume the attitude shown by FIGURE 2.

In absence of this hydraulic pressure or upon the reduction of the pressure to any appreciable level below that which overcomes the effect of the stacked springs 86 and 88, the piston 82 will begin to move down the housing and eventually will bottom on the rear wall 90 of the housing adjacent the inlet 44 (see FIGURE 3). In this position the cam 70 has been rotated by the bellcrank 68 to engage the cam surface 76 of the upper arm 52 and raise the brake pedal 14 to its maximum travel position.

Thus it may be readily appreciated by those skilled in the art to which this invention relates that whenever the split type master cylinder is not capable of producing 300 p.s.i. in a preferred embodiment tried thus far, and the brake pedal 14 has nearly reached the end of its limited travel so that the hook 58 engages the surface 60 of the slotted valve push rod 48, the ball valve 38 will be removed from the inlet of the check valve 36 to port the trapped pressure within the motor 46 to the brake system via the conduit 30. It should also be recognized that during the installation of a braking system in accordance with the principles of this invention, one would have to pump up the pressure within the motor 46 so that the pedal 14 will at the beginning be at its low or limited travel attitude shown by FIGURES 1 and 2. It, thus, follows that the brake pedal 14 after installation will not be found in its maximum travel position, shown by FIGURE 3, until after the lifting of the ball check 38. In this same regard, however, the brake pedal 14 will not automatically lower itself after it has once risen until the operator of the vehicle again pumps up the motor to a sufficient pressure on the piston 82 to overcome the stacked springs 86 and 88.

Having fully described a preferred embodiment incorporating the principles of my invention, it is now desired to set forth the protection to be derived by these Letters Patent as follows.

I claim:
1. A mounting means for an operator-operated control member, said means comprising:
   a shaft;
   a first lever pivotally mounted on said shaft, said first lever having an abutment surface depending from said shaft and an oppositely extending leg;
   a second lever fixed on said shaft;
   a third lever pivotally connected to said second lever; and
   an actuator having a housing and an actuator rod, said housing being connected to said third lever and said rod being connected to said first lever.
2. A mounting means according to claim 1 wherein said third lever includes a cam surface operatively connected to said abutment surface and said leg.
3. A mounting means according to claim 2 wherein said actuator rod is connected to a movable wall in said housing of said actuator.
4. A mounting means according to claim 3 wherein said movable wall is operatively arranged in said housing by spring means to normally cause said abutment surface to pivot said third lever to space same from said leg of said first lever.
5. A mounting means according to claim 4 and further comprising a pressure source to bias said movable wall to collapse said spring means.
6. A brake pedal mounting means comprising:
   a lever connected to said brake pedal, said lever having an upper arm which is provided with a cam surface;
   a link pivotally connected to said lever;
   a shaft to which said link is affixed;
   a bellcrank pivotally mounted on said shaft, said bellcrank having a mating surface receiving said cam surface of said upper arm in one position of said lever and a cam for forcing said cam surface away from said mating surface to change the position of said lever such that said brake pedal moves from a normal low travel position to a high travel position as said bellcrank engages said cam surface; and
   means to actuate said cam.
7. A brake pedal mounting means according to claim 6 and further characterized in that said means includes a fluid actuator having a housing pivotally connected to said upper arm and a push rod connected to said bellcrank.
8. A brake mounting means according to claim 7 and further comprising a brake master cylinder and means to transmit hydraulic pressure developed by said master cylinder to said actuator including check valve means to control the flow of hydraulic pressure to said actuator which includes a spring biased piston for returning said hydraulic pressure from said actuator while causing said bellcrank to rotate said lever about its connection with said link to increase brake pedal travel.
9. A brake mounting means according to claim 8 wherein said pivotal connection of said link and said lever includes a push rod for operating said master cylinder.

References Cited

UNITED STATES PATENTS 2,706,020   4/1955   Freers et al.

MARTIN P. SCHWADRON, *Primary Examiner.*

C. B. DORITY, *Assistant Examiner.*